United States Patent
Srinivasamurthy et al.

(10) Patent No.: US 7,853,931 B2
(45) Date of Patent: Dec. 14, 2010

(54) SYSTEM AND METHOD FOR AUTOMATICALLY GENERATING FLOW DIAGRAMS

(75) Inventors: Guruprasad Srinivasamurthy, Cupertino, CA (US); Yue Fang, Mountain View, CA (US); Zhong Zhang, Los Altos, CA (US); Pavan Bayyapu, Sunnyvale, CA (US)

(73) Assignee: SAP AG, Walldorf (DE)

( * ) Notice: Subject to any disclaimer, the term of this patent is extended or adjusted under 35 U.S.C. 154(b) by 1054 days.

(21) Appl. No.: 11/037,150

(22) Filed: Jan. 19, 2005

(65) Prior Publication Data

US 2006/0161901 A1    Jul. 20, 2006

(51) Int. Cl.
    *G06F 9/44* (2006.01)
(52) U.S. Cl. .................................. 717/132; 717/105
(58) Field of Classification Search .................. None
    See application file for complete search history.

(56) References Cited

U.S. PATENT DOCUMENTS

| | | | |
|---|---|---|---|
| 4,885,717 A * | 12/1989 | Beck et al. .................. 717/125 |
| 5,220,512 A * | 6/1993 | Watkins et al. ................. 716/11 |
| 6,480,985 B1 * | 11/2002 | Reynolds et al. ............... 716/1 |
| 6,738,964 B1 * | 5/2004 | Zink et al. .................. 717/105 |
| 6,970,844 B1 | 11/2005 | Bierenbaum |
| 7,035,837 B2 | 4/2006 | Reulein et al. |
| 7,096,222 B2 | 8/2006 | Kern et al. |
| 7,159,183 B1 | 1/2007 | Kudukoli et al. |
| 7,200,838 B2 | 4/2007 | Kodosky et al. |
| 7,206,730 B2 | 4/2007 | Pochayevets et al. |
| 7,210,117 B2 | 4/2007 | Kudukoli et al. |
| 7,234,140 B2 | 6/2007 | Dortmans |
| 7,266,807 B2 | 9/2007 | Takano et al. |
| 7,346,888 B1 | 3/2008 | Srinivasan et al. |
| 7,454,749 B2 | 11/2008 | Oberdorfer |
| 7,472,379 B2 | 12/2008 | Chessell et al. |
| 7,496,912 B2 | 2/2009 | Keller et al. |
| 7,506,302 B2 | 3/2009 | Bahrami |
| 2002/0091990 A1 | 7/2002 | Little et al. |
| 2002/0093413 A1 * | 7/2002 | Shin'ei ....................... 336/200 |
| 2003/0018512 A1 | 1/2003 | Dortmans |
| 2003/0034998 A1 * | 2/2003 | Kodosky et al. ............ 345/736 |
| 2003/0167455 A1 | 9/2003 | Iborra et al. |
| 2003/0177046 A1 | 9/2003 | Socha-Leialoha |
| 2003/0233343 A1 | 12/2003 | Li |
| 2004/0019873 A1 | 1/2004 | Pochayevets et al. |
| 2004/0133876 A1 | 7/2004 | Sproule |
| 2004/0260590 A1 | 12/2004 | Golani et al. |

(Continued)

OTHER PUBLICATIONS

Sheth et al., "An Overview of Workflow Management: From Process Modeling to Workflow Automation Infrastructure", @ 1995, Kluwer Academic Publishers, Boston, pp. 119-153.

(Continued)

*Primary Examiner*—Michael J Yigdall
*Assistant Examiner*—Evral Bodden
(74) *Attorney, Agent, or Firm*—Kenyon & Kenyon LLP (57) ABSTRACT

A method and system automatically generate a flow diagram displaying a process flow between configuration files and application files in a predefined process. An indication of a location of the configuration files and the application files is received. Flow information is extracted from the configuration files and from the application files. The flow diagram displaying a process flow between the configuration files and the application files is then generated.

41 Claims, 6 Drawing Sheets

U.S. PATENT DOCUMENTS

| | | |
|---|---|---|
| 2004/0260628 A1 | 12/2004 | Minton et al. |
| 2005/0028105 A1* | 2/2005 | Musson et al. .............. 715/744 |
| 2005/0049906 A1 | 3/2005 | Leymann et al. |
| 2006/0085681 A1 | 4/2006 | Feldstein et al. |
| 2006/0206856 A1 | 9/2006 | Breeden et al. |
| 2007/0143205 A1 | 6/2007 | Starmanns et al. |
| 2007/0256058 A1 | 11/2007 | Marfatia et al. |

OTHER PUBLICATIONS

Aversano et al., "Business Process Reengineering and Workflow Automation: A Technology Transfer Experience", 2002, The Journal of System and Software, pp. 29-44.

* cited by examiner

SYSTEM AND METHOD FOR AUTOMATICALLY GENERATING FLOW DIAGRAMS

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND OF THE INVENTION

In today's complex software environment, information may be represented in a myriad of different formats, each of which define a particular arrangement of data that can be processed and/or stored by a computer. In some computing environments, it is desirable to represent information in a process or flow. Any particular computing process can be represented in a flow diagram for easier visual comprehension of the flow of the particular process. For example, a login process could be represented in a flow diagram such that the various steps of the process are easy to visualize.

Such processes are often configured within software in a computer in particular types of files. For example, the process may be configured within a series of configuration files. The files may also be configured in other types of files, such as application files, or in a combination of different types of files, such as in a combination of configuration and application files.

These types of files defining the flow of a particular process are often numerous, and can be difficult to work with, particularly for a user who is not an expert with such computer processes. Working with the flow of such a process can be very difficult when all one has to work with is such configuration and application files. Further, modifying such files can also be difficult, particularly for the non-expert user.

Accordingly, there is a need in the art for an improved system and method for taking such process files and automatically displaying such files in a flow diagram format that is easy to visualize and use.

DETAILED DESCRIPTION

Embodiments of the present invention implement a method and system that automatically generate a flow diagram displaying a process flow between configuration files and application files in a predefined process. An indication of a location of the configuration files and the application files is received. Flow information is extracted from the configuration files and from the application files. The flow diagram displaying a process flow between the configuration files and the application files is then generated. Details of embodiments of the invention are further discussed below.

Figure 1:
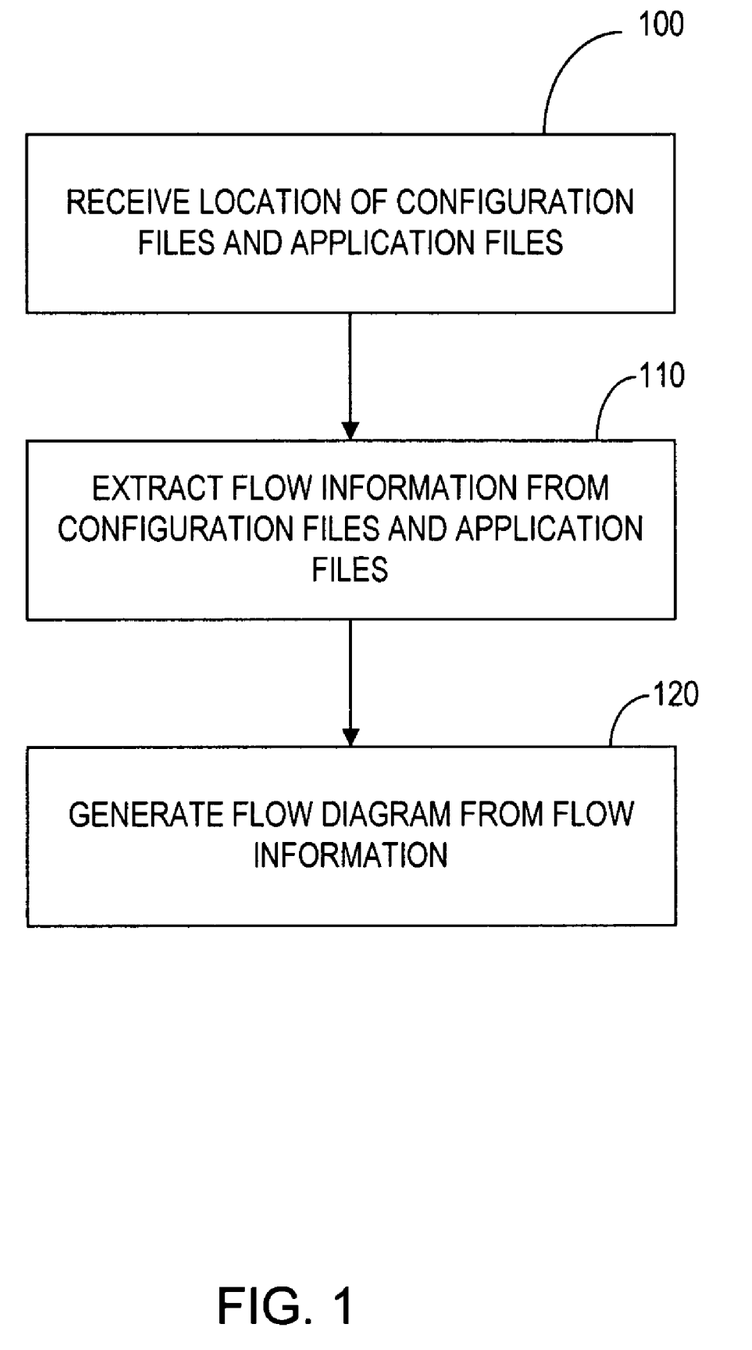
FIG. 1 is a flowchart illustrating a process in accordance with an embodiment of the present invention.

FIG. 1 depicts a process in accordance with an embodiment of the present invention. In step 100, an indication of a location of the configuration files and the application files is received. As further explained below, this indication may be input by a user that wants to automatically generate a flow diagram of the process flow between configuration files and application files for a process that has been predefined.

In step 110, flow information is extracted from the configuration files and from the application files. Details of the extraction of the flow information from the configuration files and application files are further discussed below. The flow information is information contained in the configuration files and in the application files that indicates one or more destination nodes from the configuration or application file and/or a flow label. The flow information may include flow labels and/or flow destinations.

In step 120, the flow diagram displaying a process flow between the configuration files and the application files is then generated from the flow information. The generated flow diagram and the method used to generate it are further explained below in conjunction with FIGS. 2 and 3.

Figure 2:
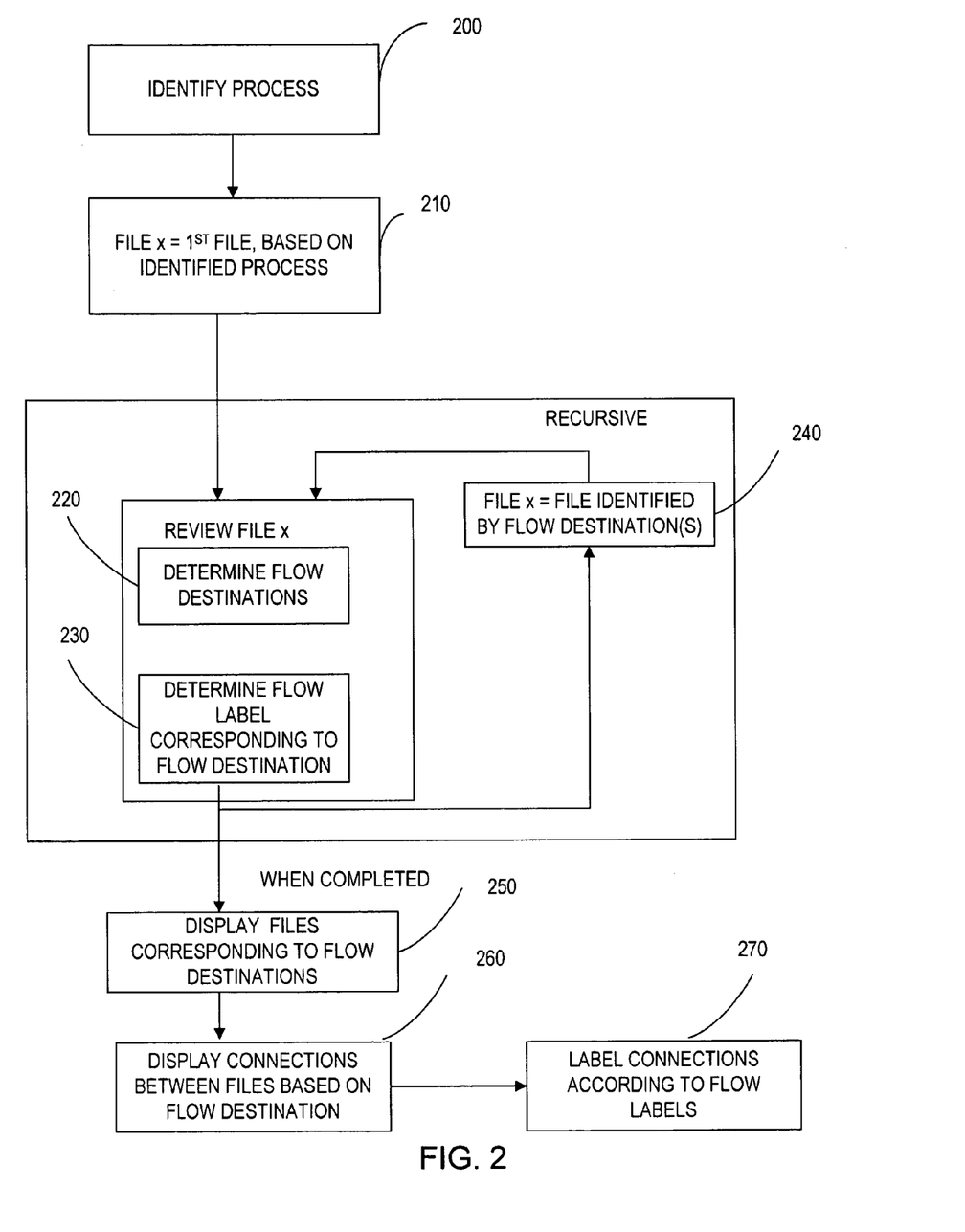
FIG. 2 is a flowchart illustrating a process in accordance with an embodiment of the present invention.

FIG. 2 illustrates a process in accordance with an embodiment of the present invention. In step 200, a process is identified by receipt of the indication of the location of the file or by other means. Each process my have one or a plurality of configuration or application files associated with it. For each file x, the present invention may process the files to determine flow destinations and/or flow labels.

In step 210, a first file in the process is identified. The flow destination for the file is determined in step 220, and the flow label (if any) is determined in step 230, as further described below. In 240, the flow destination may be used to identify additional files, and steps 220 and 230 of determining the additional flow destinations and/or flow labels will continue until all destinations and labels in the process are determined.

Figure 3:
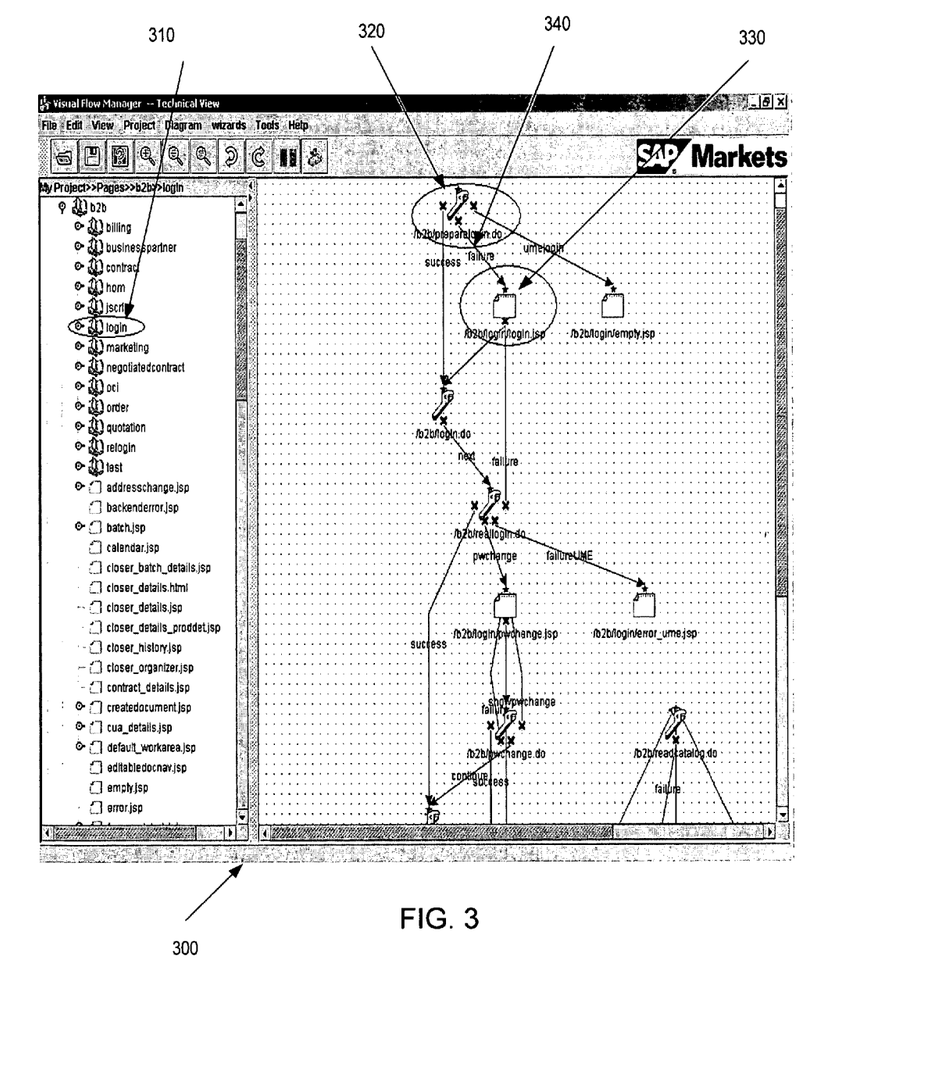
FIG. 3 is a screenshot of a flow diagram in accordance with an embodiment of the present invention.

When all of the flow destinations and/or flow labels are determined, the files may be displayed along with the corresponding flow destinations in step 250. In step 260, the connections between the files may be displayed based on the determined flow destinations. In step 270, the connections may be labeled according to the flow labels. These steps are further illustrated below FIG. 3 illustrates a flow diagram 300 that has been generated in accordance with an embodiment of the present invention. The flow diagram 300 has been generated in accordance with a predefined login process that includes application files and configuration files. The flow diagram 300 that is illustrated in FIG. 3 is a flow of a login process 310. The flow diagram 300 illustrates configuration files, application files, and the flow of the process between them. In the flow diagram 300, spanner wrench icons are used to represent configuration files and document icons are used to represent application files, although any type of icon may be used. A configuration file is represented in the flow diagram by the spanner wrench 320 labeled "/b2b/preparelogin.do". This icon could correspond to the following configuration entries in config.xml:

```
<action path="/b2b/preparelogin"
 type="com.sapmarkets.isa.isacore.action.b2b.PrepareLoginAction">
     <forward name="success" path="/b2b/login.do"/>
     <forward name="umelogin" path="/b2b/login/empty.jsp"/>
     <forward name="failure" path="/b2b/login/login.jsp"/>
</action>
```

Flow labels and flow destinations are information that may be extracted from the configuration file for use in generating the flow diagram in accordance with embodiments of the present invention. In the particular example shown above, three labels, "success", "failure" and "umelogin" are extracted from the configuration file. Also, three corresponding flow destinations are extracted, namely "/b2b/login.do", "/b2b/login/empty.jsp" and "/b2b/login/login.jsp". The flow label 340 illustrated in FIG. 2 is labeled "failure". The flow destination 330 is labeled "/b2b/login/login.jsp". The flow labels and flow destinations are useful for a user in visualizing the flow of the process.

The flow destination 330 "/b2b/login/login.jsp" is an application file, which in this case is a jsp file. Other types of application files could also be used, such as HTML (HyperText Markup Language) files. The application files also have flow information extracted from them as described above. The "/b2b/login/login.jsp" application file may include:

```
<form method="POST" action='<isa:webappsURL
  name="b2b/login.do"/>' name="login_form"
     onSubmit="return checkFields( )">
```

This application file is tokenized to extract the flow destination. This is accomplished by breaking the .jsp file from a long character stream into small parts (tokens), from which the flow destination and any flow labels may be extracted. For example, this may be accomplished by breaking the web page file from a long character stream into a series of small meaningful parts (tokens), so it is easy to operate on. In the example, the following line from a application file may be broken into a series of tokens:

<form action='<isa:webappsURL name="b2b/login.do"/>'name="loginForm"> may be broken into ["form", "action", "isa:webappsURL", "name", "b2b/login.do", "name", "loginForm"]. This may be done by using Java's (or some other language's) string operation library. Then the flow destinations can be extracted from those tokens. To achieve this, a coding standard may be used, such as SAP Internet Sales application's web page source file, where all the links are encapsulated by a specific tag (a common approach among business level internet applications). Other coding standards could also be used. The tokens are searched for that correspond to that specific tag, for example, the "isa:webappsURL" token, and then the following token is extracted as the flow destination. In this case, the flow destination "b2b/login.do" is extracted for use in creating the flow diagram. This particular destination does not include a label, but in examples where a label is used, the label is also extracted.

The flow information may be extracted from the configuration files by known techniques. For example, a standard XML package may be used for extraction, such as DOM (Document Object Model) or SAX (Simple API for XML) which are widely available and known. These XML packages may be used to parse the flow information from the files.

The present invention may use any number of application files and configuration files to generate a flow diagram, depending upon the complexity of the process. The application files may be of various types other than the .jsp files illustrated herein. The present invention may be used with a system having stored therein a large number of such processes that each can be used to generate such a flow diagram in accordance with the embodiment. For example, in addition to the "login" process 310 illustrated in FIG. 1, other processes are illustrated such as "billing", "businesspartner", etc. Each of these processes could be used to generate a flow diagram in accordance with embodiment of the invention.

Embodiments of the invention may be used with a plurality of processes, to generate a plurality of flow diagrams. The plurality of processes may be related, and even grouped together, such as, for example, in a common group or project.

Figure 4:
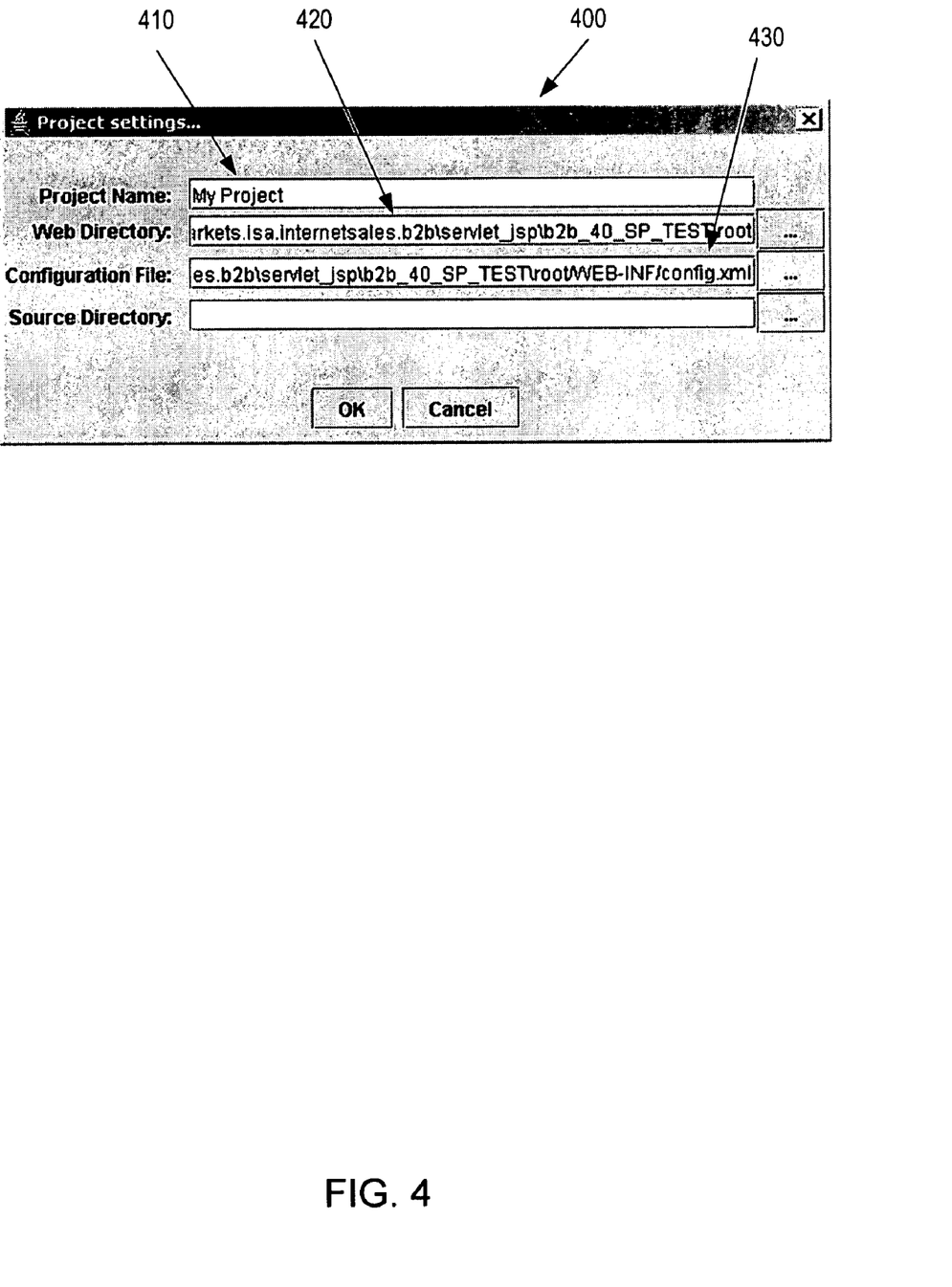
FIG. 4 is a screenshot of a flow diagram in accordance with an embodiment of the present invention.

FIG. 4 illustrates a screen shot 400 that may be used in accordance with the present invention. The screen shot 400 includes a project name 410, an application file location 420 and a configuration file location 430. The screen shot 400 is generated to prompt a user to enter the location of application files and configuration files that the present invention will use to extract the flow information used to generate the flow diagram or diagrams. Alternatively, the screenshot 400 could be used to only require entry of the project name, and the location of the configuration files and application files could automatically be generated.

Embodiments of the present invention extract the flow destinations and flow labels for each configuration file and application file, and creates the flow diagram by generating an icon for the destinations, with arrows between each destination indicating the flow. The flow labels are associated with the corresponding arrow to show a result that will cause the process to move to a particular destination. Any type of icon or symbol may be used, and the icons shown herein are only ones of many possible examples that could be used. The flow diagrams may be rendered and displayed on a screen in any of many methods known to those of skill in the art.

The screenshot 400 is shown with the project name "My Project." As may be seen with reference to FIG. 2, the project "My Project" not only includes the "login" process, but also includes the various other processes such as "billing", "businesspartner", etc. Embodiments of the present invention can be used to simultaneously generate a plurality of flow diagrams for a plurality of processes within a project, or can be used to generate one or more flow diagrams for a single process. If a project includes a plurality of processes and it is desired to generate the flow diagrams for all of the processes, embodiments of the present invention will do so by receiving the location of the configuration files and application files, and extracting the flow information for each process. The extracted flow information is then associated with the corresponding process, so that the separate flow diagrams may be formed. If the flow information is not associated with a particular process, when a user wants to display the flow diagram for a process, any flows related to it may be dynamically formed.

Figure 5:
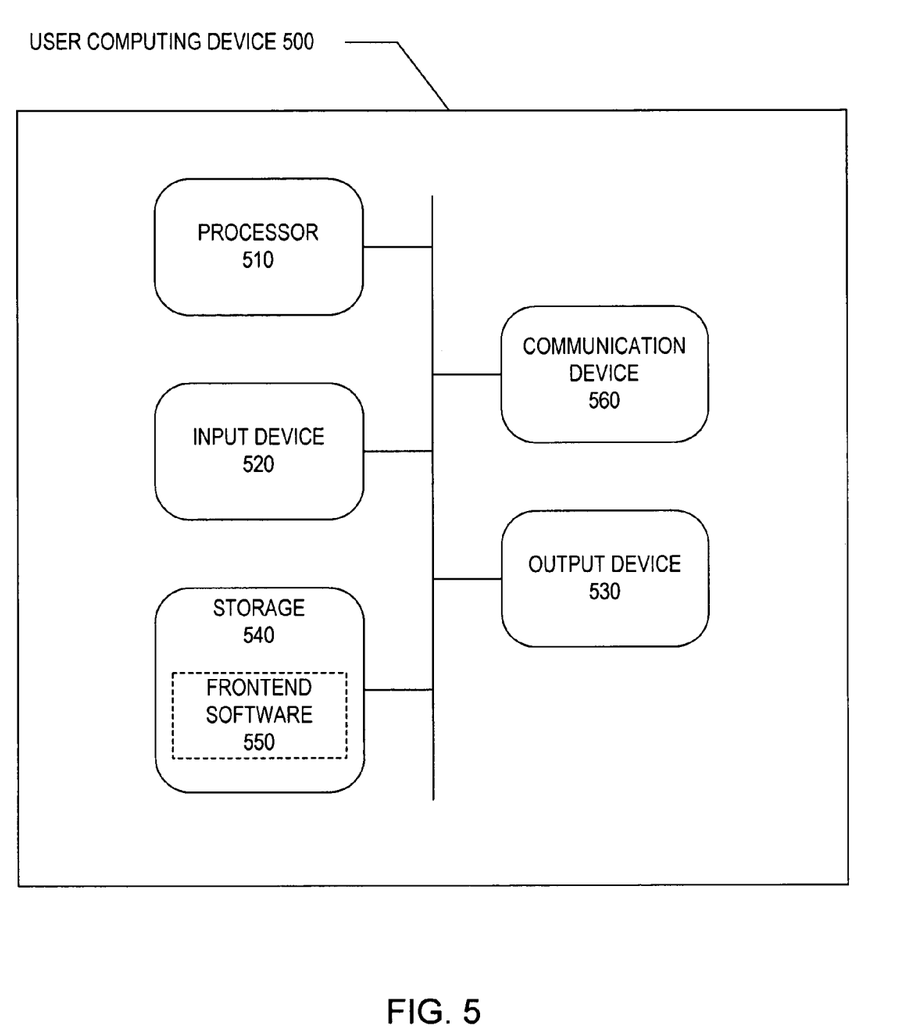
FIG. 5 is a block diagram that depicts a user computing device in accordance with an embodiment of the present invention.
Figure 6:
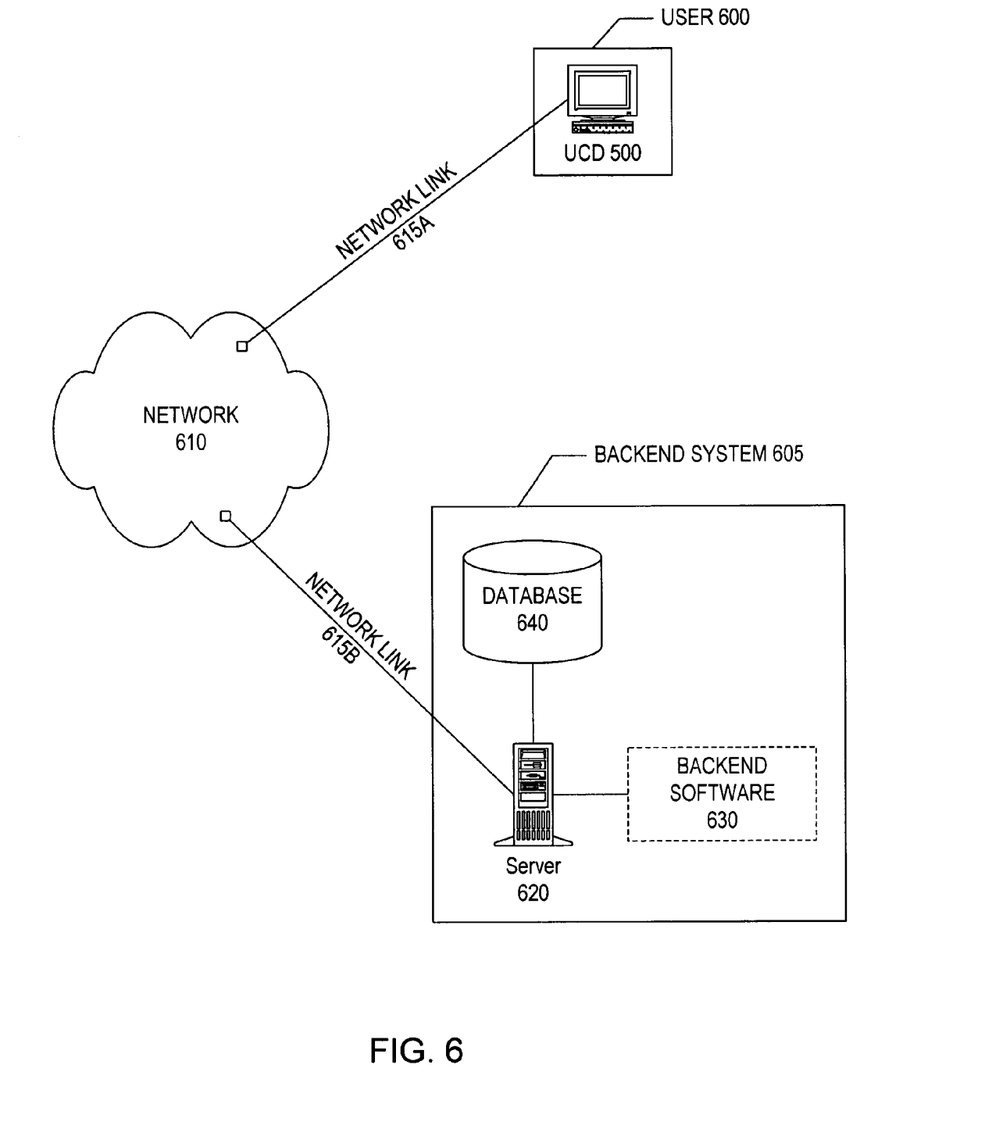
FIG. 6 is a block diagram that depicts a network architecture in accordance with an embodiment of the present invention.

FIGS. 5 and 6 illustrate the components of a basic computer and network architecture in accordance with an embodiment of the present invention. Embodiments of the present invention may not need all of the elements described herein. FIG. 5 depicts user computing device 500, which may be a personal computer, workstation, handheld personal digital assistant ("PDA"), or any other type of microprocessor-based device. User computing device 400 may include one or more of processor 510, input device 520, output device 530, storage 540, and communication device 560.

Input device 520 may include a keyboard, mouse, pen-operated touch screen or monitor, voice-recognition device, or any other device that provides input. Output device 530 may include a monitor, printer, disk drive, speakers, or any other device that provides output.

Storage 540 may include volatile and nonvolatile data storage, including one or more electrical, magnetic or optical memories such as a RAM, cache, hard drive, CD-ROM drive, tape drive or removable storage disk. Communication device 560 may include a modem, network interface card, or any other device capable of transmitting and receiving signals over a network. The components of user computing device 500 may be connected via an electrical bus or wirelessly.

Software 550, which may be stored in storage 540 and executed by processor 510, may include, for example, the client side of a client/server application that embodies the functionality of the present invention (e.g., automatically generating the flow diagrams). Thus software for executing the above-described functionality may be placed in storage 540 and executed by processor 510 to automatically generate the flow diagrams.

FIG. 6 illustrates a network architecture that could be used in accordance with an embodiment of the present invention. According to one particular embodiment, when user 600 invokes a client/server application hosted by Enterprise System 605, client software 650 of user computing device 600 communicates with server software 630 (e.g., the server side of the client/server application) of server 620 via network link 615a, network 610, and network link 615b. The server software 630 may perform the functionality of the present invention, where a user connects to the backend system via network 610, for example. In this embodiment, the flow diagrams could be generated in Server 620, and displayed at UDC 500.

Network links 615 may include telephone lines, DSL, cable networks, T1 or T3 lines, wireless network connections, or any other arrangement that implements the transmission and reception of network signals. Network 610 may include any type of interconnected communication system, which may implement any communications protocol, which may be secured by any security protocol.

Server 620 includes a processor and memory for executing program instructions as well as a network interface, and may include a collection of servers. In one particular embodiment, server 620 may include a combination of enterprise servers such as an application server and a database server. Database 640 may represent a relational or object database, and may be accessed via a database server.

User computing device 500 and server 620 may implement any operating system, such as Windows or UNIX. Client software 650 and server software 630 may be written in any programming language, such as ABAP, C, C++, Java or Visual Basic.

In other embodiments, application software embodying the functionality of the present invention may be deployed on a standalone machine or through a Web browser as a Web-based application or Web service, for example.

The invention disclosed in the above-described embodiments provides an easy to use system and method that automatically generates one or more flow diagrams from application files and/or configuration files in a predefined process. The flow diagrams may be generated with or without specific direction to do so from the user. The generated flow diagrams present a user with a graphic presentation of the flow diagrams that takes application files and/or configuration files that may be difficult to understand and use, and presents the flow diagrams in an easy to visualize format displaying the process. The user does not need to know how to work with such configuration or application files, which may be especially advantageous, especially for a user who is not familiar with these types of files.

Several embodiments of the invention are specifically illustrated and/or described herein. However, it will be appreciated that modifications and variations of the invention are covered by the above teachings and within the purview of the appended claims without departing from the spirit and intended scope of the invention.

What is claimed is:

1. A computer-implemented method for automatically generating a flow diagram displaying a process flow among software modules of configuration files and application files for a predefined process, comprising:
    receiving, by the computer, an indication of a location of the software modules of the configuration files and the application files;
    displaying, by the computer, a first type of nodes each respectively representing the configuration files and a second type of nodes each respectively representing the application files;
    for each of the first type of nodes representing the configuration files,
        extracting from the configuration file represented by the each of the first type of nodes, by the computer, (1) flow labels each indicating a nature of a flow from the each of the first type of nodes and (2) destination files, the destination files being one of the configuration files and the application files; and
    for each of the second type of nodes representing the application files,
        breaking up, by the computer, character streams contained in the application file represented by the each of the second type of nodes into tokens;
        identifying from the application file represented by the each of the second type of nodes, by the computer, specific tags among the tokens in accordance with a predetermined specific tag library; and
        identifying from the application file represented by the each of the second type of nodes, by the computer, (1) flow labels each indicating a nature of a flow from the each of the second type of nodes and (2) destination files, the destination files being one of the configuration files and the application files; and
    automatically generating, by the computer, the flow diagram by further displaying the process flows among the first type of nodes representing the configuration files and the second type of nodes representing application files for the predefined process by displaying the flow labels and by displaying connections from each of the first and second types of nodes to nodes representing destination files of the each of the first and second types of nodes.

2. The method of claim 1, wherein displaying the process flow from the flow information comprises displaying an icon representing each of the flow destinations, displaying a flow direction indicator between ones of the flow destinations indicating a direction of process flow, and displaying the flow labels in association with corresponding flow direction indicators.

3. The method of claim 1, wherein the flow diagram includes an indication associated with the flow labels that indicate a flow direction between the flow destinations.

4. The method of claim 1, wherein the configuration files are .jsp (Java Server Pages) files.

5. The method of claim 1, wherein the flow label and/or flow destination are extracted from application files stored in an application root directory.

6. The method of claim 1, wherein extracting the flow information from the application files comprises tokenizing the application files and extracting the flow information from the tokenized files.

7. The method of claim 1, wherein extracting flow information from the configuration files and from the application files comprises determining a flow destination for a first file, determining a first flow label for the first file, determining a second flow destination for a second file, and determining a second flow label for the second file.

8. The method of claim 1, wherein extracting flow information from the configuration files and from the application files comprises:
   identifying a plurality of the configuration files and/or the application files;
   for a first one of the configuration and/or application files, determining a flow destination and a flow label; and
   repeating the determining step for each of the remaining configuration files and/or application files.

9. A computer-implemented method for automatically generating a separate flow diagram displaying process flows among software modules of configuration files and application files for each of a plurality of predefined processes, each flow diagram being generated from the configuration files and the application files in the corresponding predefined process, comprising:
   receiving, by the computer, an indication of a location of the software modules of the configuration files and the application files;
   displaying, by the computer, a first type of nodes each respectively representing the configuration files and a second type of nodes each respectively representing the application files;
   for each of the first type of nodes representing the configuration files,
      extracting from the configuration file represented by the each of the first type of nodes, by the computer, (1) flow labels each indicating a nature of a flow from the each of the first type of nodes, and (2) destination files, the destination files being one of the configuration files and the application files; and
   for each of the second type of nodes representing the application files,
      breaking up, by the computer, character streams contained in the application file represented by the each of the second type of nodes into tokens;
      identifying from the application file represented by the each of the second type of nodes, by the computer, specific tags among the tokens in accordance with a predetermined specific tag library; and
      identifying from the application file represented by the each of the second type of nodes, by the computer, (1) flow labels each indicating a nature of a flow from the each of the second type of nodes and (2) destination files, the destination files being one of the configuration files and the application files; and
   automatically generating, by the computer, the flow diagram by further displaying the process flows among the first type of nodes representing the configuration files and the second type of nodes representing application files for the predefined process by displaying the flow labels and by displaying connections from each of the first and second types of nodes to nodes representing destination files of the each of the first and second types of nodes.

10. The method of claim 9, wherein displaying the process flows from the flow information comprises displaying an icon representing each of the flow destinations, displaying a flow direction indicator between ones of the flow destinations indicating a direction of process flow, and displaying the flow labels in association with corresponding flow direction indicators.

11. The method of claim 9, wherein the flow diagram includes an indication associated with the flow labels that indicate a flow direction between the flow destinations.

12. The method of claim 9, wherein the configuration files are .jsp (Java Server Pages) files.

13. The method of claim 9, wherein the flow label and/or flow destination are extracted from application files stored in an application root directory.

14. The method of claim 9, wherein extracting the flow information from the application files comprises tokenizing the application files and extracting the flow information from the tokenized files.

15. The method of claim 9, wherein extracting flow information from the configuration files and from the application files comprises determining a flow destination for a first file, determining a first flow label for the first file, determining a second flow destination for a second file, and determining a second flow label for the second file.

16. The method of claim 9, wherein extracting flow information from the configuration files and from the application files comprises:
   identifying a plurality of the configuration files and/or the application files;
   for a first one of the configuration and/or application files, determining a flow destination and a flow label; and
   repeating the determining step for each of the remaining configuration files and/or application files.

17. An apparatus for automatically generating a flow diagram displaying a process flow among software modules of configuration files and application files in a predefined process, comprising:
   a processor; and
   a memory coupled to the processor, the memory storing instructions adapted to be executed by the processor to:
      receive an indication of a location of the software modules of the configuration files and the application files;
      displaying, by the computer, a first type of nodes each respectively representing the configuration files and a second type of nodes each respectively representing the application files;
      for each of the first type of nodes representing the configuration files,
         extracting from the configuration file represented by the each of the first type of nodes, by the computer, (1) flow labels each indicating a nature of a flow from the each of the first type of nodes, and (2) destination files, the destination files being one of the configuration files and the application files; and
      for each of the second type of nodes representing the application files,
         breaking up, by the computer, character streams contained in the application file represented by the each of the second type of nodes into tokens;
         identifying from the application file represented by the each of the second type of nodes, by the computer, specific tags among the tokens in accordance with a predetermined specific tag library; and identifying from the application file represented by the each of the second type of nodes, by the computer, (1) flow labels each indicating a nature of a flow from the each of the second type of nodes and (2) destination files, the destination files being one of the configuration files and the application files; and automatically generating, by the computer, the flow diagram by further displaying the process flows among the first type of nodes representing the configuration files and the second type of nodes representing application files for the predefined process by displaying the flow labels and by displaying connections from each of the first and second types of nodes to nodes representing destination files of the each of the first and second types of nodes.

18. The apparatus of claim 17, wherein the instructions to display the process flow from the flow information comprise instructions to: display an icon representing each of the flow destinations, display a flow direction indicator between ones of the flow destinations indicating a direction of process flow, and display the flow labels in association with corresponding flow direction indicators.

19. The apparatus of claim 17, wherein the flow diagram includes an indication associated with the flow labels that indicate a flow direction between the flow destinations.

20. The apparatus of claim 17, wherein the configuration files are .jsp (Java Server Pages) files.

21. The apparatus of claim 17, wherein the flow label and/or flow destination are extracted from application files stored in an application root directory.

22. The apparatus of claim 17, wherein the instructions to extract flow information from the configuration files and from the application files comprises instructions to tokenize the application files and extract the flow information from the tokenized files.

23. The apparatus of claim 17, wherein the instructions to display the process flow from the flow information comprise instructions to: display an icon representing each of the flow destinations, display a flow direction indicator between ones of the flow destinations indicating a direction of process flow, and display the flow labels in association with corresponding flow direction indicators.

24. The apparatus of claim 17, wherein the instructions to extract flow information from the configuration files and from the application files comprises instructions to determine a flow destination for a first file, determine a first flow label for the first file, determine a second flow destination for a second file, and determine a second flow label for the second file.

25. The apparatus of claim 17, wherein the instructions to extract flow information from the configuration files and from the application files comprises instructions to:
identifying a plurality of the configuration files and/or the application files;
for a first one of the configuration and/or application files, determining a flow destination and a flow label; and
repeat the determining step for each of the remaining configuration files and/or application files.

26. An apparatus for automatically generating a separate flow diagram displaying process flows among software modules of configuration files and application files for each of a plurality of predefined processes, each flow diagram being generated from the configuration files and the application files for the corresponding predefined process, comprising:
a processor; and
a memory coupled to the processor, the memory storing instructions adapted to be executed by the processor to:
receive an indication of a location of the software modules of the configuration files and the application files;
displaying, by the computer, a first type of nodes each respectively representing the configuration files and a second type of nodes each respectively representing the application files;
for each of the first type of nodes representing the configuration files,
extracting from the configuration file represented by the each of the first type of nodes, by the computer, (1) flow labels each indicating a nature of a flow from the each of the first type of nodes, and (2) destination files, the destination files being one of the configuration files and the application files; and
for each of the second type of nodes representing the application files,
breaking up, by the computer, character streams contained in the application file represented by the each of the second type of nodes into tokens;
identifying from the application file represented by the each of the second type of nodes, by the computer, specific tags among the tokens in accordance with a predetermined specific tag library; and
identifying from the application file represented by the each of the second type of nodes, by the computer, (1) flow labels each indicating a nature of a flow from the each of the second type of nodes and (2) destination files, the destination files being one of the configuration files and the application files; and
automatically generating, by the computer, the flow diagram by further displaying the process flows among the first type of nodes representing the configuration files and the second type of nodes representing application files for the predefined process by displaying the flow labels and by displaying connections from each of the first and second types of nodes to nodes representing destination files of the each of the first and second types of nodes.

27. The apparatus of claim 26, wherein the instructions to display the process flow from the flow information comprise instructions to: display an icon representing each of the flow destinations, display a flow direction indicator between ones of the flow destinations indicating a direction of process flow, and display the flow labels in association with corresponding flow direction indicators.

28. The apparatus of claim 26, wherein the flow diagram includes an indication associated with the flow labels that indicate a flow direction between the flow destinations.

29. The apparatus of claim 26, wherein the configuration files are .jsp (Java Server Pages) files.

30. The apparatus of claim 26, wherein the flow label and/or flow destination are extracted from application files stored in an application root directory.

31. The apparatus of claim 26, wherein the instructions to extract flow information from the configuration files and from the application files comprises instructions to tokenize the application files and extract the flow information from the tokenized files.

32. The apparatus of claim 26, wherein the instructions to extract flow information from the configuration files and from the application files comprises instructions to determine a flow destination for a first file, determine a first flow label for the first file, determine a second flow destination for a second file, and determine a second flow label for the second file.

33. The apparatus of claim 17, wherein the instructions to extract flow information from the configuration files and from the application files comprises instructions to:

identifying a plurality of the configuration files and/or the application files;

for a first one of the configuration and/or application files, determining a flow destination and a flow label; and repeat the determining step for each of the remaining configuration files and/or application files.

34. The method of claim 1, wherein at least one of the first and second types of nodes is connected to more than one nodes representing destination files.

35. The method of claim 1, wherein at least one of the node representing destination files is connected to more than one nodes representing configuration files and applications files.

36. The method of claim 9, wherein at least one of the node representing destination files is connected to more than one nodes representing configuration files and applications files.

37. The method of claim 9, wherein at least one of the node representing destination files is connected to more than one nodes representing configuration files and applications files.

38. The apparatus of claim 17, wherein at least one of the node representing destination files is connected to more than one nodes representing configuration files and applications files.

39. The apparatus of claim 17, wherein at least one of the node representing destination files is connected to more than one nodes representing configuration files and applications files.

40. The apparatus of claim 26, wherein at least one of the node representing destination files is connected to more than one nodes representing configuration files and applications files.

41. The apparatus of claim 26, wherein at least one of the node representing destination files is connected to more than one nodes representing configuration files and applications files.

* * * * *